United States Patent [19]
Rasmussen

[11] Patent Number: 5,425,548
[45] Date of Patent: Jun. 20, 1995

[54] AIR BAG MODULE WITH A CENTRALLY MOUNTED TOROIDAL INFLATOR USING A CLAMSHELL INFLATOR RETENTION SYSTEM

[75] Inventor: Kirk Rasmussen, West Point, Utah

[73] Assignee: Morton International, Inc., Chicago, Ill.

[21] Appl. No.: 136,355

[22] Filed: Oct. 14, 1993

[51] Int. Cl.$^6$ .............................................. B60R 21/16
[52] U.S. Cl. .................................... 280/728.2; 280/741
[58] Field of Search ............... 280/728 R, 731, 732, 280/736, 741 R, 728 A

[56] References Cited

U.S. PATENT DOCUMENTS

| | | | |
|---|---|---|---|
| 5,1522,549 | 10/1992 | Aird | 280/728 A |
| 3,901,530 | 8/1975 | Radke | 280/736 |
| 4,013,010 | 3/1977 | Schneiter et al. | 280/741 |
| 5,199,740 | 4/1993 | Frantom et al. | 280/736 |
| 5,290,059 | 3/1994 | Smith et al. | 280/741 |
| 5,314,203 | 5/1994 | Adams et al. | 280/728 A |

FOREIGN PATENT DOCUMENTS 2443267  3/1975  Germany ................... 280/741

Primary Examiner—Margaret A. Focarino
Assistant Examiner—Paul N. Dickson
Attorney, Agent, or Firm—Gerald K. White

[57] ABSTRACT

An air bag module uses a toroidal inflator which is clamped in the center of the module. The toroidal inflator used in the module does not have a flange for the attachment thereof to the module housing. The inflator is clamped in the module between the housing and a retaining bracket so that an inflator flange is not needed. The appearance and function of the module are not changed. Only the internal components of the module are changed.

14 Claims, 4 Drawing Sheets

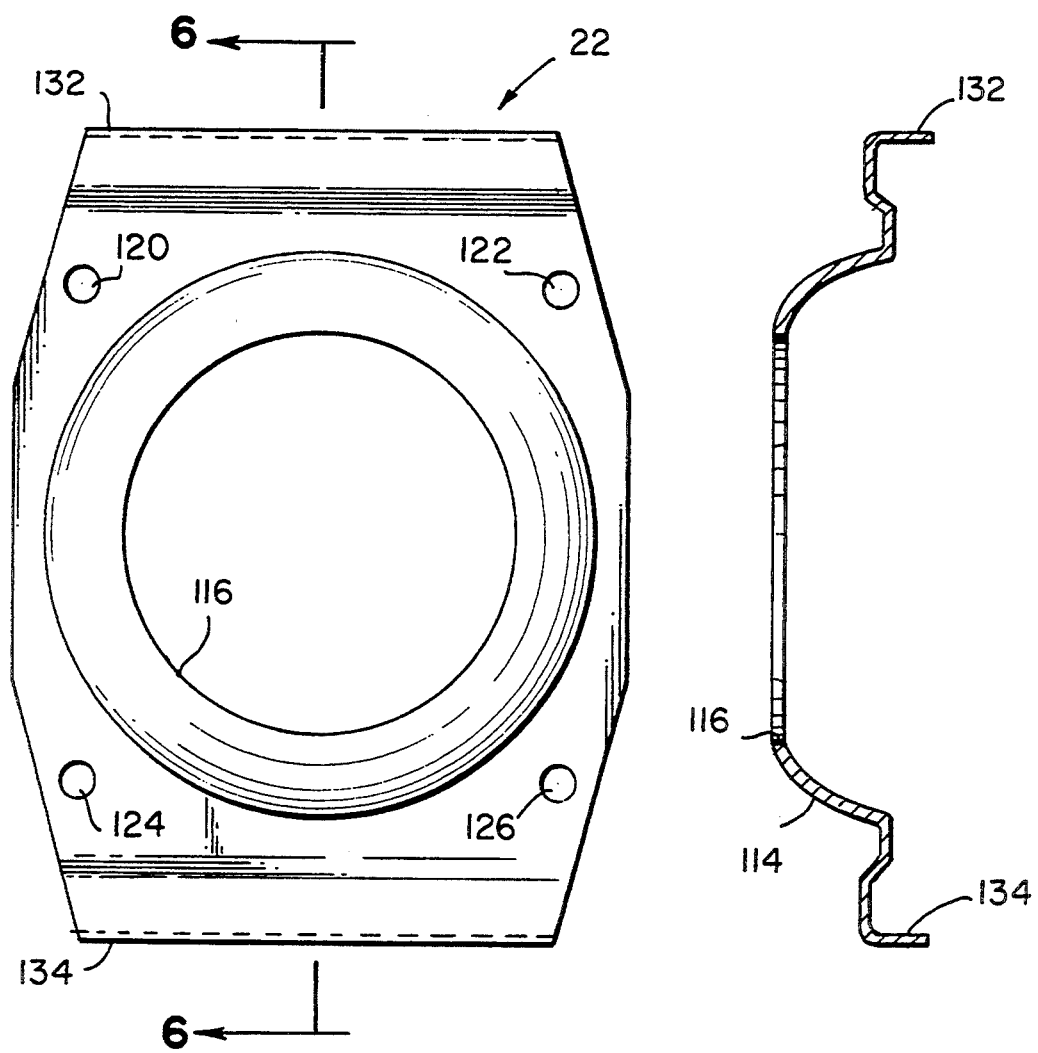
FIG. 5
FIG. 6
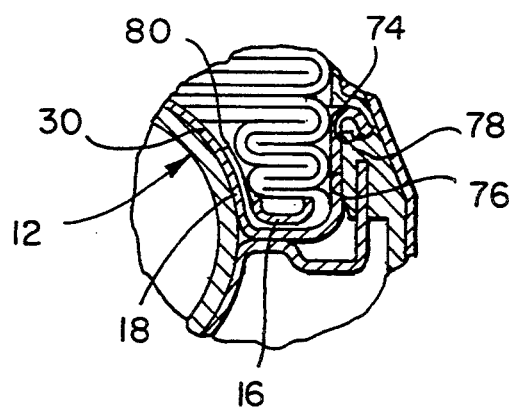
FIG. 9

FIG. 7
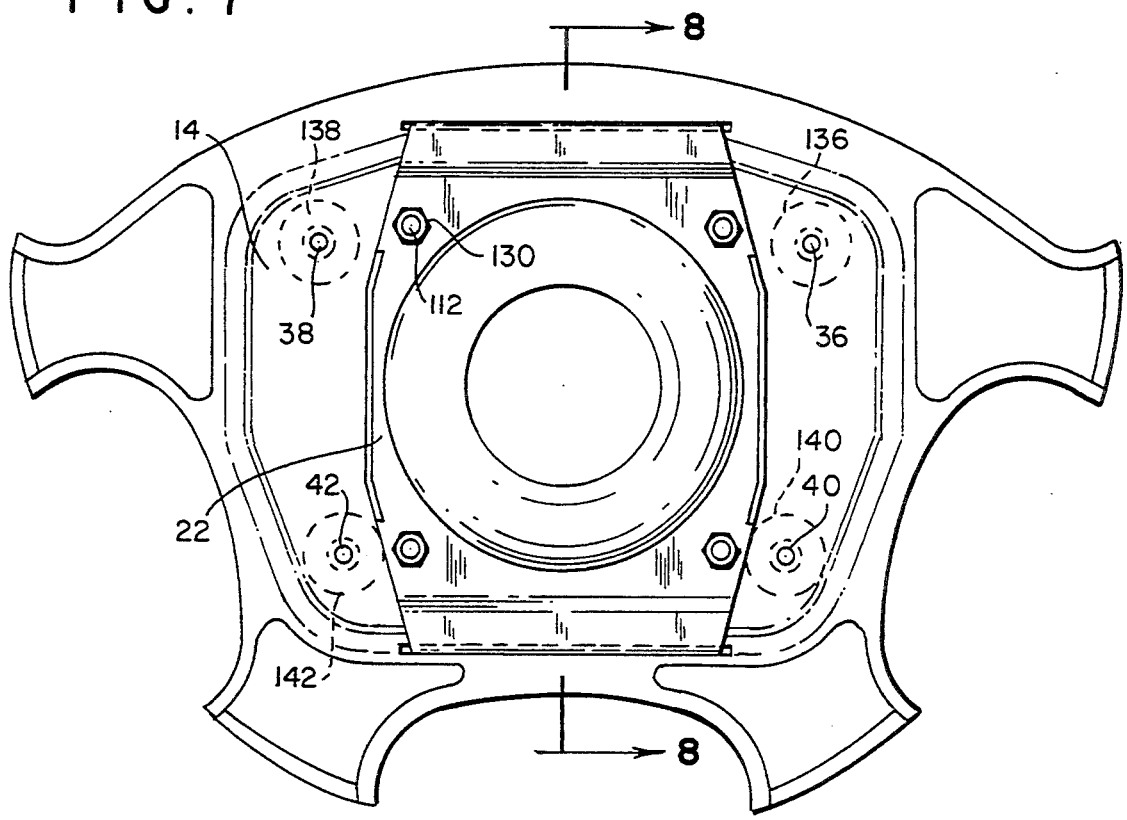
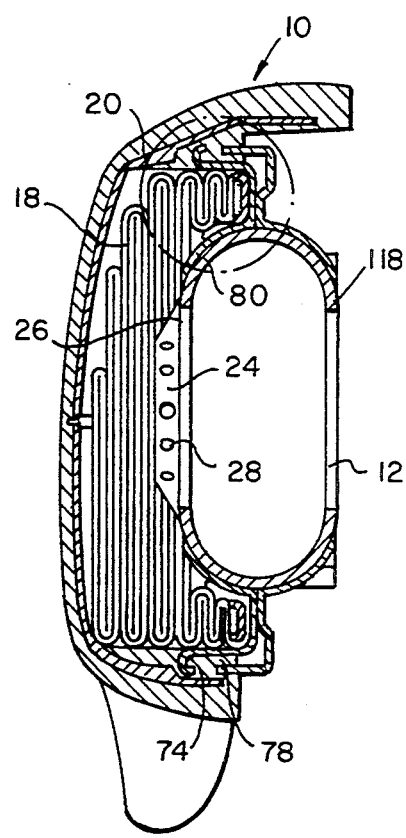
FIG. 8

AIR BAG MODULE WITH A CENTRALLY MOUNTED TOROIDAL INFLATOR USING A CLAMSHELL INFLATOR RETENTION SYSTEM

BACKGROUND OF THE INVENTION

1. Field of the Invention

This invention relates to an air bag module for use on the driver side of automotive and other vehicles wherein an inflatable air bag or cushion is inflated in the event of a collision to protect the driver from injury that could result from being forcibly thrown against the steering wheel, dashboard, etc. The air bag module uses a toroidal hybrid inflator assembly.

2. Description of the Related Art

Pyrotechnic inflator assemblies that currently are in use in driver side air bag modules, as disclosed, for example, in U.S. application for patent bearing Ser. No. 07/820,826, filed Jan. 15, 1992 by Gary V. Adams and Bradley W. Smith, typically are toroidal types having relatively flat disk-like shapes that include a flange. The modules currently produced use the flange of the toroidal inflator to attach it to the module housing.

Inflator assemblies of the toroidal type, as disclosed in the aforementioned U.S. application for patent bearing Ser. No. 07/820,826, produce a cushion inflating gas source from a combustible gas generating material which, upon ignition, generates a quantity of gas sufficient to inflate the cushion. In another form of toroidal inflator assembly, the cushion inflating gas results from a combination of stored compressed gas and a gas generating material, as disclosed, for example, in German patent Off. 2443 267 and in U.S. Pat. Nos. 3,901,530 and 5,199,740. The latter form of toroidal inflator assembly is commonly referred to as a toroidal augmented gas or hybrid inflator. A toroidal hybrid inflator affects the performance of an air bag module in several ways including variation in the amount of stored gas, the transmission of heat to the stored gas, and the rate at which the inflating gas is dispensed into the inflatable cushion.

The toroidal hybrid inflator is characterized in that it does not have a flange to attach it to the air bag module. There is thus a need and a demand to devise another method to attach the toroidal hybrid inflator to an air bag module thereby to eliminate the need for a flange to be welded thereto. The present invention was devised to fill the technological gap that has existed in the art in these respects.

SUMMARY OF THE INVENTION

An object of the invention is to provide an air bag module for the driver side of an automotive or other vehicle which module uses a toroidal inflator assembly that is so clamped in the module that a flange is not needed, there being no change in the external appearance and function of the module and with only the internal components of the module being changed.

Another object of the invention is to provide such an air bag module in which the toroidal inflator assembly is mounted in the center of the module.

Still another object of the invention is to provide such an air bag module in which the toroidal inflator assembly is of the augmented gas or hybrid type.

A further object of the invention is to provide such an air bag module in which the toroidal hybrid inflator assembly is held very firmly in position within the air bag module during the life of the module.

Another object of the invention is to provide such an air bag module in which the inflating gas discharge exit openings of the toroidal hybrid inflator assembly are substantially sealed within the inflating gas inlet opening of the inflatable cushion stored in folded condition within the air bag module.

An additional object of the invention is to provide such an air bag module in which the toroidal hybrid inflator assembly is of the "thrust neutral" type in which the gas discharge openings are so positioned that upon initiation of the inflator assembly the gas is discharged in opposing directions whereby there are not resulting forces tending to cause movement of the inflator assembly.

In accomplishing these and other objectives of the invention, there is provided, in cooperative relation with a toroidal inflator assembly having no flange to attach it to an air bag module, a different housing and retaining bracket than that used in current designs to assemble a driver side air bag module. The external appearance and function of the driver side air bag module according to the invention are not changed insofar as it would be of any concern to the purchaser of an automotive or other vehicle in which such air bag module is installed. Only the internal components of the air bag module are changed.

In a preferred embodiment of the invention, the tubular inflator assembly is a hybrid type, a pressure vessel including a storage chamber that is filled and pressurized with an inert gas such as Argon or Nitrogen to a pressure typically in the range of 2000-4000 psi. The storage chamber is defined a toroidal container. A pyrotechnic heater typically is centrally positioned in sealing relation in the storage chamber from the bottom of the container. A diffuser protrudes, that is, projects outwardly from the upper surface of the container at a central location thereof. Provided in the diffuser are a plurality of gas exit ports or orifices for dispensing inflating gas uniformly in opposing directions in a thrust neutral manner from the pressurized chamber.

The toroidal hybrid inflator assembly is partially positioned in a concave raised portion of the module housing. This raised portion is located substantially in the center of the housing and, closely matching the upper body portion contour of the toroidal hybrid inflator, allows the inflator to nest in the housing. The diffuser of the inflator protrudes through a hole in the center of the raised portion of the module housing into the area or space where the air bag or cushion would be packed. The contour of the raised portion of the module housing closely matches the inflator and normally would be half as deep as the inflator is thick. If the inflator needs to be moved into the module more to reduce the envelope size, the raised portion of the housing is made larger to accommodate the inflator.

The cushion retaining ring in the air bag module for clamping the inflatable cushion to the module housing and the toroidal inflator assembly is the same type of rivetless retaining ring that is used in air bag modules of current design. The retaining ring encircles the raised concave portion of the housing.

The cushion used in the module according to the preferred embodiment of the invention is the same as that which is currently used in driver side air bag modules. Fasteners such as studs or bolts, which have been pressed into the retaining ring, also extend through the fabric of the cushion, the module housing, and a retaining bracket. The module is held together with nuts on the studs or bolts.

The retaining bracket has a concave lowered portion in it to support the lower or bottom half of the toroidal hybrid inflator assembly and to hold it in place. The lowered concave portion closely matches the bottom contour of the inflator. Module cover retaining brackets are incorporated in the retaining bracket so that it is a unitary member or system instead of three pieces. The radius of the downward concave portion of the retaining bracket is made such that, when nuts on the studs that hold the air bag module together, are drawn down, the toroidal hybrid inflator assembly is held very firmly in position and will be so held during the life of the air bag module.

The attach or mounting points of the air bag module for the attachment thereof to the steering wheel of an automotive or other vehicle are located on the module housing. The mounting arrangement for the module assembly may comprise a two-point attachment or a four-point attachment as needed.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which:

FIG. 5 is a bottom view of the retaining bracket;

FIG. 6 is a sectional view of the retaining bracket taken along the lines 6—6 of FIG. 5;

FIG. 7 is a bottom view of the air bag module assembly;

FIG. 8 is a sectional view of the air bag module assembly taken along the lines 8—8 of FIG. 7; and FIG. 9 is an enlarged view of a portion of FIG. 8 showing the inflatable cushion extending along the raised portion of the module housing.

DESCRIPTION OF THE PREFERRED EMBODIMENT

Figure 2:
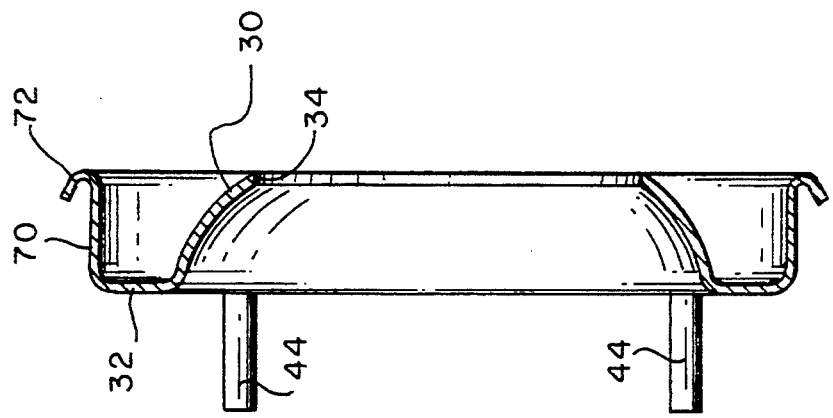
FIG. 2 is a sectional view of the module housing of the air bag module taken along the lines 2—2 of FIG. 1.

Referring to the figures of drawing, an air bag module 10 according to the invention comprises a toroidal hybrid inflator assembly 12, a module housing 14, a cushion retaining ring 16, a folded inflatable cushion 18 formed of a suitable air bag fabric, a module cover 20, and a retaining bracket 22.

The toroidal hybrid inflator assembly 12, as shown in FIG. 8, does not have a flange and includes a short cylindrical diffuser 24. The diffuser 24 protrudes outwardly from the inflator assembly exterior upper surface 26. A plurality of gas exit ports or orifices 28 facing in different directions in substantially the same plane in the cylindrical wall of the diffuser 24 dispense inflating gas in a thrust neutral manner. Thus, upon initiation of the toroidal hybrid inflator assembly 12 and the flow of gas through ports 28 there are no forces that tend to cause disruptive movement of the toroidal inflator assembly 12 in the air bag module 10.

Figure 1:
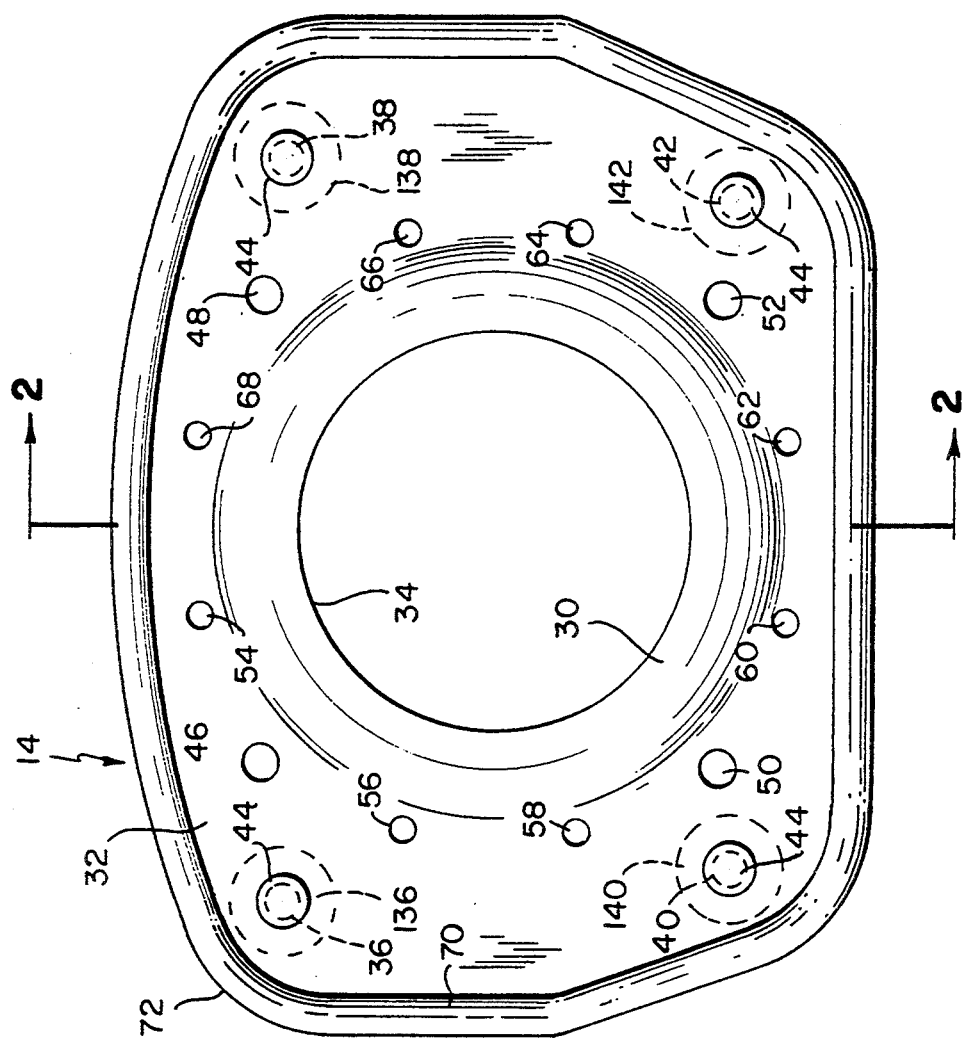
FIG. 1 is a top view of the module housing of the air bag module according to the invention.

The module housing 14 has a base planar portion 32 from which a raised concave portion 30 extends and in which the upper half of the toroidal hybrid inflator assembly 10 is positioned. The raised concave portion 30, as best seen in FIGS. 1 and 2, is located in the center of the module housing 14 and allows the toroidal hybrid inflator assembly 12 to nest therein. Centrally located in the raised concave portion 30 of the module housing 14, as seen in FIGS. 1 and 2, is an opening or hole 34 through which the diffuser 24 and a portion of the upper half of the toroidal hybrid inflator assembly 12 extends.

The module housing 14 includes four spaced holes 36, 38, 40 and 44 that provide a four-point attach system for the air bag module 10, that is, for the attachment thereof to the steering wheel of an automotive or other vehicle. A stud, designated 44 in each case, extends downwardly through each of the holes 36, 38, 40 and 42. Four additional evenly spaced holes 46, 48, 50 and 52 provide a means for the attachment to the module housing 14 of the toroidal hybrid inflator assembly 12, the retaining ring 16, the inflatable cushion 18, and the retaining bracket 22. Eight additional smaller sized holes 54, 56, 58, 60, 62, 64, 66 and 68 are provided in the module housing 14 for the attachment thereto of the retaining ring 16 and the inflatable cushion 18.

The module housing 14 further includes an upwardly extending wall 70 that extends completely around the periphery thereof. The upper edge of the wall 70 is curled outwardly forming a rolled-over lip 72, as shown in FIGS. 2 and 8. Lip 72 engages and is locked in mating relation in a groove 74 in the side wall 76 of an inner portion 78 of the module cover 20, as best seen in FIG. 9, when the module housing 14 and the folded inflatable cushion 18 are pressed in place within the cover 20.

The inflatable cushion 18 as illustrated in FIGS. 8 and 9, has a substantially circular inflating gas inlet opening 80 with an inner periphery in a generally central region thereof. The diameter of the cushion gas inlet opening 80 is less than the diameter of the raised concave portion 30 immediately adjacent the base plan portion 32 of the module housing 14. Concave portion 30 is inserted through the cushion gas inlet opening 80 in the assembly of the air bag module 10.

Figure 3:
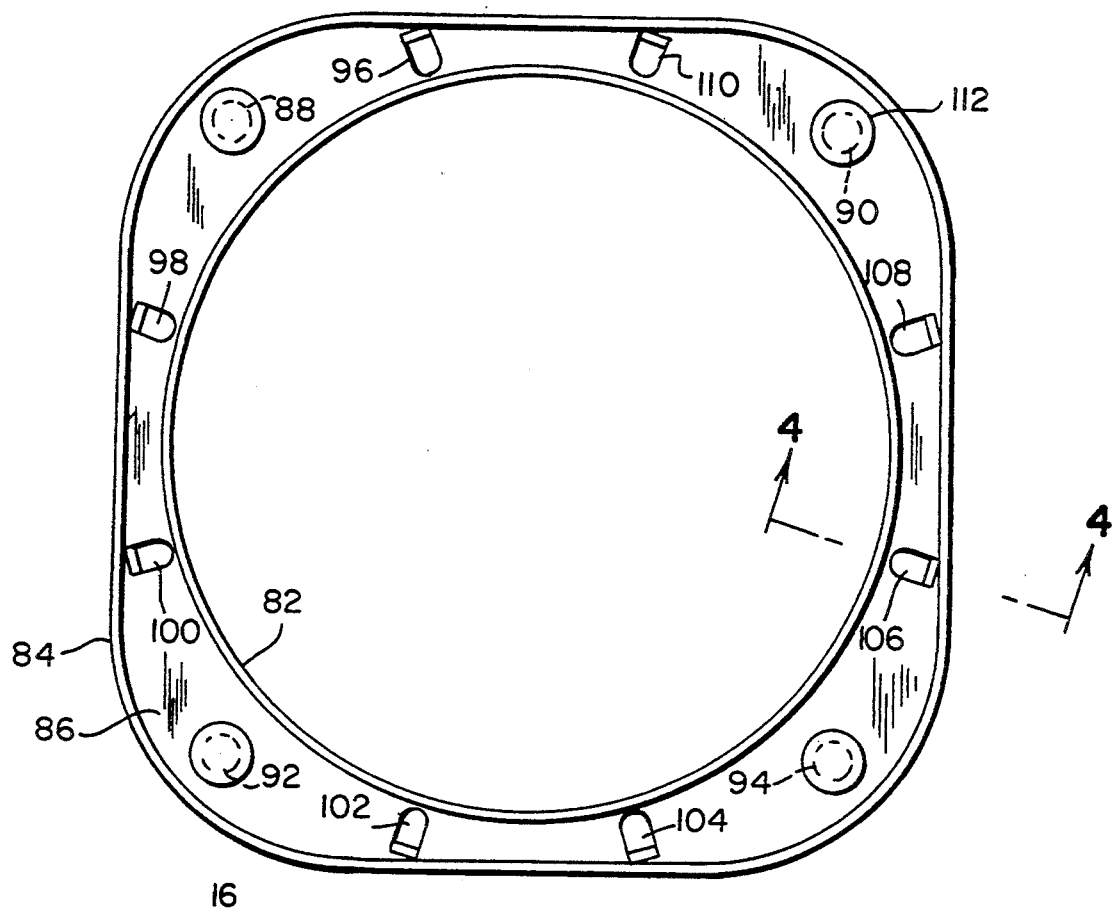
FIG. 3 is a top plan view of the cushion retaining ring.
Figure 4:
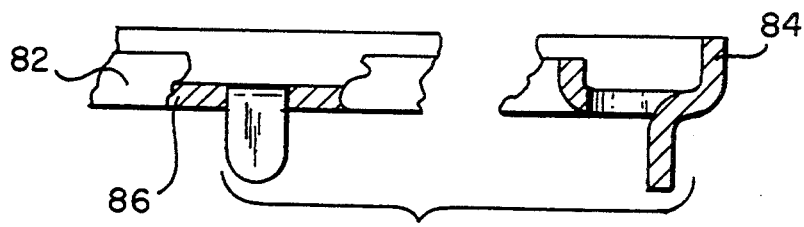
FIG. 4 is a sectional view of the cushion matching ring taken along the lines 4—4 of FIG. 3.

For effecting the attachment of the inflatable cushion 18 to the module housing 14, the retaining ring 16 is inserted through the gas inlet opening 80 in the cushion 18. The retaining ring 16, as shown in FIG. 3, has a substantial circular inner boundary and a generally rectangular outer boundary with a low inner wall 82 and a higher outer wall 84, on one side of a base planar portion 86, with both walls 82 and 84 being disposed substantially perpendicular to the planar base 86. The diameter of circular inner boundary of the retaining ring 16 is substantially the same as the diameter of the concave portion 30 at the surface of the base planar portion 32 of the module housing 14.

Four spaced holes 88, 90, 92 and 94 are provided in the planar base 86. The planar base 86 of the retaining ring 16 also includes eight spaced downwardly extending tabs 96, 98, 100, 102, 104, 106, 108 and 110. The spacing of the holes 88–94 and of the tabs 96–110 is such that when the retaining ring 16 is placed in cooperating relation with the module housing 14 over the raised concave portion 30, the four holes 88–94 in the retaining ring 16 align with a respectively associated one of the four holes 46–52 in the module housing 14, and the eight tabs 96–110 in the retaining ring 16 align with a respectively associated one of the eight holes 54–68 in the module housing 14o Fasteners such as bolts or studs designated by reference numeral 112 and having a head at one end and threaded at the other end are inserted from the wall side of the retaining ring 16 through each of the holes 88–94. The retaining ring 16 is then inserted in the gas inlet opening 80 in the cushion 80 with the wall side of the retaining ring 16 facing inwardly of the cushion 18. The studs 112 are inserted through holes that are provided in the cushion 18 and match in position the holes 88–94 that are provided in the retaining ring 16. The peripheral area of the cushion 18 near the gas inlet opening is placed around the module housing concave portion 30 side of the inner wall 82 of the retaining ring 16. With the retaining ring 16 so positioned relatively to the upper side of the module housing 14, the eight tabs 96–110 hanging down from the retaining ring 16 match in position the eight holes 54–68 in the base plane portion 32 of the module housing 14 and extend there through. Tabs 96–110 extend through the holes 54–68. The threaded ends of the four studs 112 hang downwardly from the module housing planar base 32.

As shown in FIG. 9, with the module housing concave portion 30 extended through the opening 80 of the inflatable cushion 18, and with the side of the retaining ring 16 opposite the walls 82 and 84 thereof pressing the fabric of the cushion 18 against the upper surface of the base plane portion 32 of the module housing 14, a portion of the peripheral region of the cushion 18 near the gas inlet opening 80 extends along and is pressed against the surface of the module housing concave wall.

The retaining bracket 22, as shown in FIGS. 5 and 6, has a lowered concave portion 114 in which the lower or bottom half of the toroidal hybrid inflator is positioned in physically contacting relation and thereby supported, as shown in FIGS. 8 and 9. The concave portion. 114 is located in the center of the retaining bracket 22. Centrally located in the concave portion 114 is an opening or hole 116 through which a portion 118 of the bottom or lower half of the toroidal hybrid inflator 12 may extend. Four spaced holes 120, 122, 124 and 126 are provided in a base planar portion or member 128 of the retaining bracket 22. The spacing of the holes 120–126 is the same as the spacings of the holes 46–52 of the module housing 14 and of the holes 88–94 of the retaining ring 16. Thus, when the retaining bracket 22 is placed in a cooperative relation with respect to the module housing 14 with the bottom half portion 118 of the toroidal hybrid inflator 12 extending through the hole 116 of the retaining bracket concave portion 114, the four holes 120–126 of the retaining bracket 22 are in alignment with the four holes 46–52 of the module housing 14 and the four holes 88–94 of the retaining ring 16.

Clamping of the peripheral area or region of the cushion 18 near the gas inlet opening 80 thereof between the retaining ring 16 and the upper surface of the module housing planar base 32 is effected by positioning and firmly securing the retaining bracket so that the concave portion 114 thereof supports the bottom half of the hybrid inflator 12. Such firm securement is obtained by the application of and torquing of a nut 130 on the threaded ends of each of the four studs 112 that protrude from the holes 120–126 of the retaining bracket 22 as shown in FIG. 7. The manner in which the toroidal hybrid inflator 12 is clamped between the module housing 14 and the retaining bracket 22 is illustrated in FIG. 8.

With the peripheral region adjacent the gas inlet opening 80 of the inflatable cushion 18 clamped between the retaining ring 16 and the module housing 14, the air bag module is assembled with the toroidal hybrid inflator 12 securely attached. The inflatable cushion 18 can be folded prior to or after such assembly, as desired.

As shown in FIGS. 5 and 6, the retaining bracket 22 is generally rectangular in shape. Cover retaining brackets 132 and 134 are incorporated, that is, formed integrally with the retaining bracket 22. The cover retaining brackets 132 and 134 cooperate with the module housing wall 70 and rolled over lip 72 to lock the module cover 20 in place on the air bag module 10.

The mounting points of the air bag module 10 are located on the module housing 14 and comprise holes 36, 38, 40 and 42 which, as best seen in FIGS. 1 and 7, are positioned in circular embossments 136, 138, 140 and 142, respectively. These holes facilitate the attachment by studs 44 of the air bag module 10 to the steering wheel of an automotive or other vehicle.

In the operation of the air bag module 10, the impact upon a crash or collision is detected by a sensor (not shown) which ignites a pyrotechnic heater provided in the toroidal hybrid inflator 12. The inflator 12 discharges inflating gas into the cushion 18 to effect rapid inflation thereof, breaking open the cover 20, which, as shown in FIG. 8, is rupturable, so that the bag can expand over the region between the steering wheel and the driver of the vehicle and thus absorb the impact on the driver. At this time the clamped portion of the cushion 18 is subjected to high radial forces which tend to pull cushion 18 from the mounted position thereof. However, the engagement of the air bag gas inlet opening 80 by radial clamping provided by the inner wall 82 of the retaining ring 16 and the concave portion 30 of the module housing 14 act in opposition to those forces and retains the cushion 18 firmly in place, thus preventing gas leakage and assuring the protection of the driver.

Thus, in accordance with the invention, there has been provided an air bag module for the driver side of an automotive or other vehicle in which a toroidal hybrid inflator assembly 12 of thrust neutral type is employed. The toroidal hybrid inflator assembly 12 is mounted in the center of the air bag module 10, being firmly held in position therewithin with the diffuser inflating gas discharge exit openings 28 thereof substantially sealed within the gas inlet opening 80 of the inflatable cushion 18 stored within the air bag module 10.

Although the invention has been described in an application in which the air bag module 10 is mounted to a steering wheel for the protection of the driver, those skilled in the art will understand that the air bag module can be mounted to the dashboard or some other part of the body of the vehicle. Those skilled in the art will understand also that although the invention has been described as involving toroidal hybrid inflators that it is applicable also for use with other toroidal inflators having no flange.

With this description of the invention in detail, those skilled in the art will appreciate that modifications may be made to the invention without departing from the spirit thereof, Therefore, it is not intended that the scope of the invention be limited to the specific embodiments that have been illustrated and described. Rather, it is intended that the scope of the invention be determined by the appended claims and their equivalents.

What is claimed is:

1. A vehicle air bag module comprising,
   a module housing including a base planar portion having a generally centrally located raised concave portion and an upwardly extending wall that extends substantially around the periphery thereof, said concave portion having a substantially centrally located hole provided therein,
   a toroidal inflator having an upper half and a lower half with a diffuser provided at an upper portion of the upper half of said inflator, the upper half of said inflator being so contoured and physically positioned as to nest in said raised concave portion of said module housing with said diffuser extending through said hole provided in said concave portion,
   a retaining bracket including a base planar portion having a generally centrally located concave portion with a substantially centrally located hole therein, which concave portion extends in physically contacting relation around at least a portion of said inflator, with said base planar portion thereof positioned against said base planar portion of said module housing, and
   means to clamp the base planar portion of said retaining bracket to the base planar portion of said module housing thereby to clamp said inflator to said module housing.

2. A vehicle air bag module as defined by claim 1, wherein the size of the centrally located hole in said retaining bracket is such as to allow a portion of the lower half of said inflator to extend therethrough when the base planar portions of said retaining bracket and of said module housing are clamped together.

3. A vehicle air bag module as defined by claim 1 further including,
   an inflatable cushion formed of a suitable air bag fabric and having a gas inlet opening with an inner peripheral region formed therein, and
   a retaining ring having a substantially circular inner boundary and an outer boundary with a low inner wall and a higher outer wall on a wall side surface of a base planar portion thereof with both walls being disposed substantially perpendicular to said base planar portion thereof, with the diameter of said circular inner boundary being substantially the same as the diameter of said module housing concave portion at the base planar portion thereof, said retaining ring being positioned in said gas inlet opening of said cushion with said wall side surface thereof facing inwardly and extending around the inner periphery region thereof, said retaining ring being positioned in cooperative relation with said module housing over said concave portion thereof,
   wherein said means to clamp said base planar portion of said retaining bracket to the base planar portion of said module housing also clamps said base planar portion of said retaining ring and at least a portion of the inner peripheral region of said cushion to said base planar portion of said module housing.

4. A vehicle air bag module as defined by claim 3, wherein the base planar portion of said module housing includes a plurality of spaced holes therein, and
   wherein said retaining ring includes a plurality of tabs extending in spaced relation from the surface of said base planar portion thereof that is opposite to the wall side surface from which said walls extend, said tabs being so positioned on said retaining ring that they align with and extend through at least some of said plurality of holes in the base planar portion module housing.

5. A vehicle air bag module as defined by claim 4, wherein the peripheral region of said cushion and each of the base planar portions of said module housing, said retaining ring and said retaining bracket include holes that are all in alignment, and
   wherein said means to clamp the base planar portions of said retaining ring and said retaining bracket to the base planar portion of said module housing comprise a plurality of studs which extend through said holes in said cushion and said base planar portions that are in alignment, each of which studs has a head at one end and is threaded at the other end with each of the heads positioned in engagement with the wall side surface of said retaining ring, and a nut screwed on and tightened on the threaded end of each stud.

6. A vehicle air bag module as defined in claim 5, wherein said inflatable cushion is folded,
   wherein the upper edge of said upward extending wall of said module housing is curled outwardly forming a rolled over lip, and further including
   a cover for said inflatable cushion and module housing, said cover including a groove in a side wall of an inner portion thereof,
   whereby said rolled over lip on said module housing upwardly extending wall engages and is locked in mating relation in said groove in the side wall of the inner portion of said cover when said module housing and cushion are pressed in place within said cover.

7. A vehicle air bag module as defined in claim 6, wherein said retaining bracket includes cover retaining brackets that are formed integrally therewith and are positioned in engagement with said side wall of said cover and thereby cooperate with said module housing and rolled over lip to lock said cover in place on said air bag module.

8. A vehicle air bag module as defined by claim 7, wherein the opening in said inflatable cushion is substantially circular and is less than the diameter of the raised concave portion of said module housing at the base planar portion thereof,
   said module housing concave portion extends through said opening and the side of said base planar portion of said retaining ring opposite said walls thereof engages the upper surface of the base planar portion of said module housing and a portion at least of said peripheral region of said cushion near said gas inlet opening thereof extends along and in engagement with the surface of the module housing raised concave portion.

9. A vehicle air bag module comprising,
   a module housing including a base planar portion having a generally centrally located raised concave portion and an upwardly extending wall that extends substantially around the periphery thereof, said concave portion having a substantially centrally located hole provided therein, said base planar portion having a plurality of spaced holes therein, a toroidal inflator having an upper half and a lower half with a diffuser provided at an upper portion of the upper half of said inflator, the upper half of said inflator being so contoured and positioned as to nest in said raised concave portion of said module housing with said diffuser extending through said hole provided in said concave portion, an inflatable cushion formed of a suitable air bag fabric and having a gas inlet opening with an inner peripheral region formed therein, a retaining ring having a substantially circular inner boundary and a generally rectangular outer boundary with a low inner wall and a higher outer wall on a wall side surface of a base planar portion thereof with both walls being disposed substantially perpendicular to said base planar portion thereof, said retaining ring having a plurality of tabs extending in spaced relation from the side of said base planar portion that is opposite to the wall side surface from which said walls extend, said retaining ring being positioned in said gas inlet opening of said cushion with said wall side surface facing inwardly and extending around the inner peripheral region thereof, said retaining ring being positioned in cooperative relation with said module housing over said concave portion with said tabs extending outwardly through the fabric of said cushion, said tabs being so positioned on said retaining ring that they align with and extend through at least some of said plurality of holes in said base planar portion of said module housing, a retaining bracket including a base planar portion having a generally centrally located concave portion with a substantially centrally located hole therein, which concave portion extends in physically contacting relation around at least a portion of said inflator, with said base planar portion thereof positioned against said base planar portion of said module housing, and means extending through the fabric of said cushion and the base planar portions of said retaining ring, said module housing, and said retaining bracket to clamp the peripheral region of said cushion and said toroidal inflator to said module housing.

10. A vehicle air bag module as defined in claim 9,
wherein said means extending through the fabric of said cushion and the base planar portions of said retaining means, said module housing, and said retaining bracket to clamp the peripheral region of said cushion and said toroidal inflator to said module housing comprise a plurality of studs each of which has a head at one end and is threaded at the other end with said head positioned in engagement with the wall side of said retaining ring, and a nut screwed on and tightened on the threaded end of each of said studs.

11. A vehicle air bag module as defined in claim 9,
wherein said inflatable cushion is folded,
wherein the upper edge of said upwardly extending wall of said module housing is curled outwardly forming a rolled-over lip, and further including
a cover for said folded inflatable cushion and module housing, said cover having a side wall including a groove in an inner portion thereof,
whereby said rolled-over lip on said module housing upwardly extending wall engages and is locked in mating relation in said groove in the side wall of the inner portion of said cover when said module housing and cushion are pressed in place within said cover.

12. A vehicle air bag module as defined in claim 10,
wherein said retaining bracket includes cover retaining brackets that are formed integrally therewith and are positioned in engagement with said side wall of said cover and thereby cooperate with said module housing and rolled-over lip to lock said cover in place on said air bag module.

13. A vehicle air bag module as defined by claim 9,
wherein the opening in said inflatable cushion is substantially circular and is less than the diameter of the raised concave portion of said module housing at the base planar portion thereof,
wherein said module housing concave portion extends through said opening and the side of said base planar portion of said retaining ring opposite said walls thereof engages the upper surface of the base planar portion of said module housing and at least a portion of said peripheral region of said cushion near said gas inlet opening thereof extends along and in engagement with the surface of the module housing raised concave portion.

14. A vehicle air bag module comprising,
a module housing including a base planar portion having a generally centrally located raised concave portion and an upwardly extending wall that extends substantially around the periphery thereof, said concave portion having a substantially centrally located hole provided therein, said base planar portion having a plurality of spaced holes therein,
wherein the upper edge of said upwardly extending wall of said module housing is curled outwardly forming a rolled-over lip,
a toroidal inflator having an upper half and a lower half with a diffuser provided at an upper portion of the upper half of said inflator, the upper half of said inflator being so contoured and positioned as to nest in said raised concave portion of said module housing with said diffuser extending through said hole provided in said concave portion,
a folded, inflatable cushion formed of a suitable air bag fabric and having a gas inlet opening with an inner peripheral region formed therein,
a retaining ring having a base planar portion including a substantially circular inner boundary and a generally rectangular outer boundary with a low inner wall and a higher outer wall disposed substantially perpendicular from a first surface of said base planar portion, said base planar portion of said retaining ring having a second surface that is opposed to said first surface and from which a plurality of spaced tabs extend, said retaining ring and said gas inlet opening and inner peripheral region of said cushion being positioned in cooperative relation with said module housing over said concave portion with said tabs extending outwardly through the fabric of said cushion, said tabs being so positioned on said retaining ring that they align with and extend through at least some of said plurality of holes in said planar base portion of said module housing,
wherein the opening in said inflatable cushion is substantially circular and is less than the diameter of the raised concave portion of said module housing at the base plane portion thereof, wherein said module housing concave portion extends through said opening and said second surface of said retaining ring engages the upper surface of the base planar portion of said module housing and a portion at least of said peripheral region of said cushion near said gas inlet opening, a retaining bracket including a base planar portion having a generally centrally located lowered concave portion that extends around the bottom half of said inflator with said base planar portion positioned against the bottom surface of said base planar portion of said module housing, and means extending through the fabric of said cushion and the base planar portions of said retaining ring, said module housing, and said retaining bracket to clamp the peripheral region of said cushion and said toroidal inflator to said module housing, said means comprising a plurality of studs each of which has a head at one end and is threaded at the other end with said head positioned in engagement with said first surface of said retaining ring, and a nut screwed on and tightened on the threaded end of each of said studs, and further including, a cover for said folded inflatable cushion and module housing, said cover having a side wall including a groove in an inner portion thereof, said module housing and cushion being pressed in place within said cover, wherein said rolled-over lip on said module housing upwardly extending wall engages and is locked in mating relation in said groove in the side wall of said cover when said module housing and cover are pressed in place within said cover, and wherein said retaining bracket includes cover retaining brackets that are formed integrally therewith and are positioned in engagement with said side wall of said cover and thereby cooperate with said module housing and rolled-over lip to lock said cover in place on said air bag module.

* * * * *

UNITED STATES PATENT AND TRADEMARK OFFICE
CERTIFICATE OF CORRECTION

PATENT NO. : 5,425,548
DATED : June 20, 1995
INVENTOR(S) : Kirk Rasmussen

It is certified that error appears in the above-indentified patent and that said Letters Patent is hereby corrected as shown below:

Title Page, under References Cited, "5,1522,549" should be
--5,152,549--.

Column 5, line 8, "14o" should be --14.--.

Column 5, line 44, "portion. 114 is located" should be
--portion 114 is located--.

Column 8, line 10, "portion module housing." should be
--portion of said module housing.--.

Signed and Sealed this

Eleventh Day of June, 1996

Attest:

BRUCE LEHMAN

Attesting Officer  Commissioner of Patents and Trademarks